United States Patent [19]

Ackeret

[11] Patent Number: 4,760,502
[45] Date of Patent: Jul. 26, 1988

[54] STORAGE CONTAINER FOR RECORDING MEDIA

[75] Inventor: Peter Ackeret, Kusnacht, Switzerland

[73] Assignee: IDN Inventions and Development of Novelties AG, Chur, Switzerland

[21] Appl. No.: 941,080

[22] Filed: Dec. 12, 1986

[30] Foreign Application Priority Data

Dec. 13, 1985 [DE] Fed. Rep. of Germany ....... 3544054

[51] Int. Cl.$^4$ ............................................. H04M 1/22
[52] U.S. Cl. ...................................... 362/86; 206/311; 206/387; 206/444; 312/12; 312/234.3; 340/815.31
[58] Field of Search .................... 362/86, 32, 26, 29, 362/30, 23, 87; 206/311, 444, 387; 340/815.12, 815.13, 815.15, 815.31; 312/10, 12, 234.3

[56] References Cited

U.S. PATENT DOCUMENTS

| | | | |
|---|---|---|---|
| 3,557,360 | 1/1971 | Aldridge | 362/86 X |
| 3,647,986 | 3/1972 | Lace et al. | 340/815.31 X |
| 4,322,780 | 3/1982 | Murakami et al. | 362/86 X |
| 4,493,417 | 1/1985 | Ackeret | 206/444 X |
| 4,592,600 | 6/1986 | Bohnet et al. | 312/234.3 X |
| 4,625,263 | 11/1986 | Strohmeier | 362/86 X |
| 4,655,344 | 4/1987 | Ackeret | 206/307 |
| 4,702,372 | 10/1987 | Ackeret | 206/387 |

FOREIGN PATENT DOCUMENTS 58-14302 1/1983 Japan ..................................... 362/86

Primary Examiner—Lloyd L. King
Attorney, Agent, or Firm—Chilton, Alix & Van Kirk

[57] ABSTRACT

The invention relates to a storage container for recording media with a housing, open at the front, that accommodates a plurality of holders for in each case at least one recording medium, wherein a front covering over the interior of the housing is provided and the holders are individually displaceable towards the front out of the housing into a position in which the recording medium disposed therein can easily be grasped, and with indicating means arranged in the region of the front and visible through indicator windows (104) in the front, which holders are occupied by recording media. In order to be able to see in the dark whether or not a holder is occupied, indicating means are provided which comprise light sources that are visible from the outside through the windows and which include associated switch-over means which are operable by the removal and insertion of a recording medium into a holder.

36 Claims, 9 Drawing Sheets

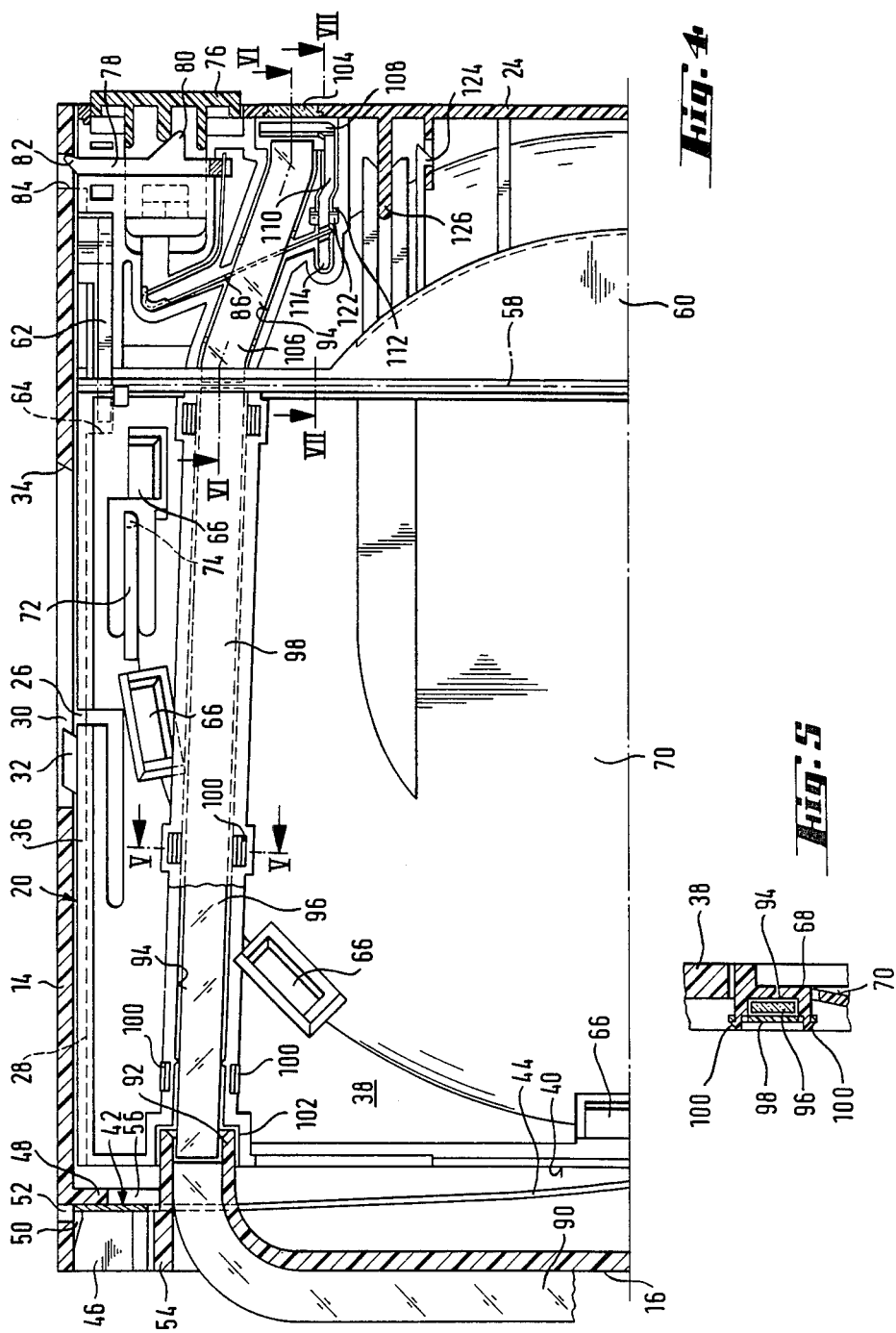

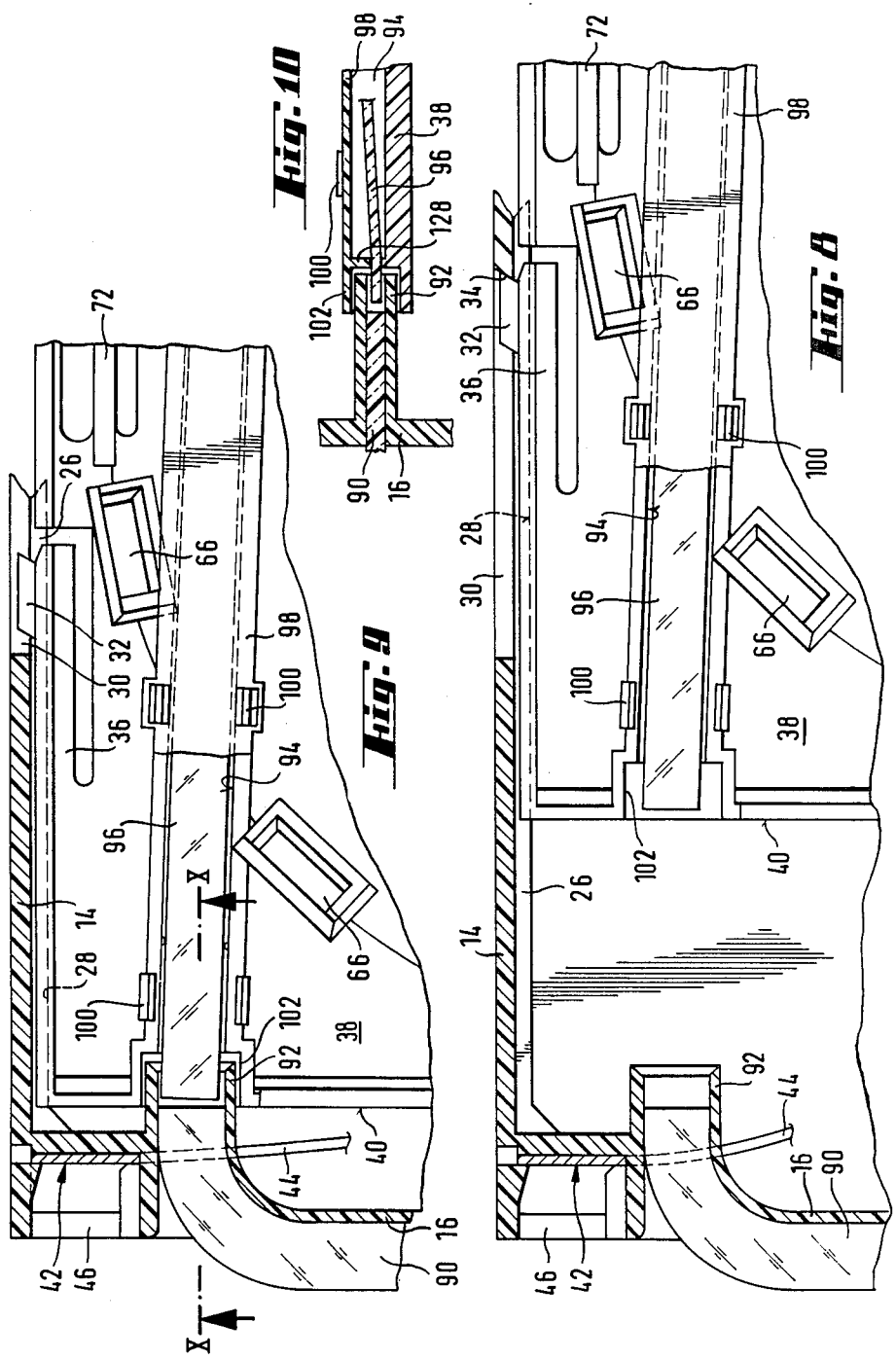

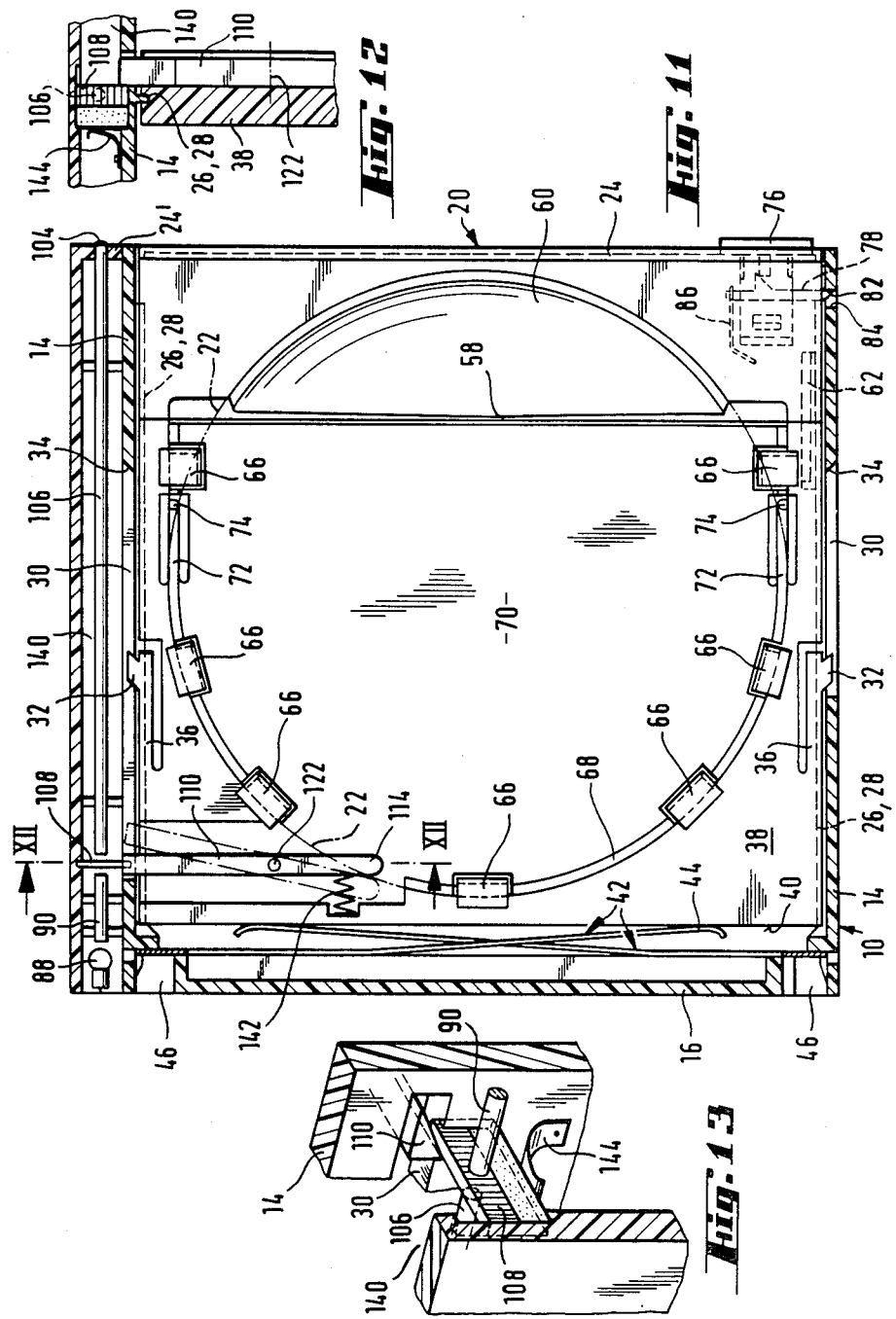

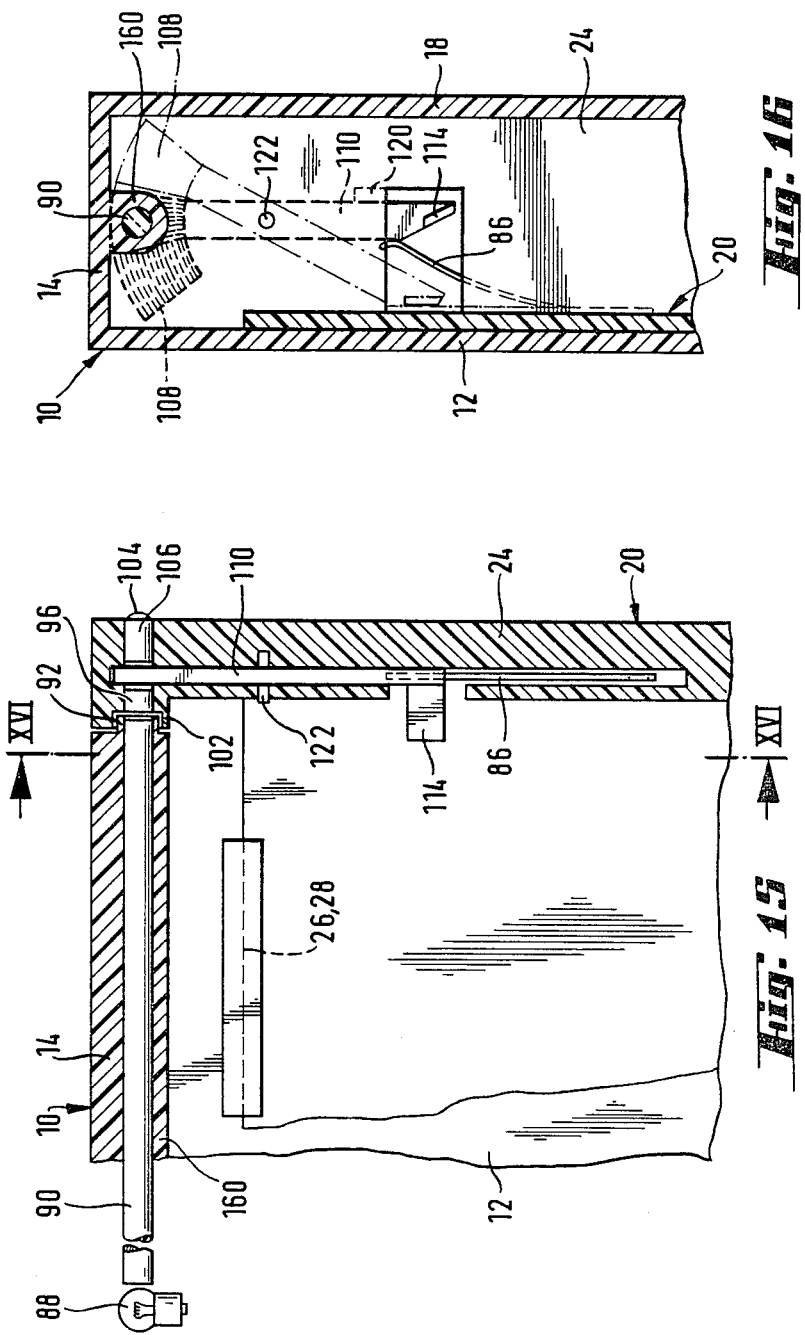

STORAGE CONTAINER FOR RECORDING MEDIA

BACKGROUND OF THE INVENTION

1. Field of the Invention

The present invention relates to the temporary storage of recording media, magnetic tape cassettes and "compact" optical information storage discs for example, and particularly to the provision of a visual indication of the presence or absence of such recording media in storage apparatus. More specifically, this invention is directed to storage systems for recording media and especially to such systems wherein a visually observable indicator is associated with each of a plurality of media holders which are moveably accommodated within a container for translation between media storage and media removal positions. Accordingly, the general objects of the present invention are to provide novel and improved methods and apparatus of such characters.

2. Brief Description of the Prior Art

Recording media storage systems which accommodate a plurality of media holders within a housing are known in the art. The media holders of the known storage systems are individually displaceable between a storage position, wherein the media is located within the housing, and an ejected position wherein the holders are displaced toward the front of the housing to a position in which the recording media disposed thereon can be easily grasped and removed for use. It is obviously desirable to provide such storage systems with an indicator or indicators which convey the status, i.e., loaded or unloaded, of the individual media holders Published German Patent Application Serial No. P 32 15 721 discloses a storage system for magnetic tape cassettes wherein a visual indication of whether a slider member arranged in a housing is occupied or unoccupied is provided by means of a displaceable or pivotal colored element, the colored element being brought into registration with an indicator window so as to be visible from the outside of the housing as a result of the insertion of a cassette into the slider member. A principle disadvantage of the arrangement of this published German application resides in the fact that the indication, i.e., the slider member status signal, is not visible under poor lighting conditions. Tape cassette storage systems are frequently installed in motor vehicles and it is obviously undesirable for a driver to have to be distracted by the need to search, for example, for an unoccupied slider member.

SUMMARY OF THE INVENTION

The present invention overcomes the above-briefly discussed and other deficiencies of the prior art by providing a readily visible indication of the status of each of a plurality of holders of a multi-holder recording media storage system. The provision of such indication, in apparatus in accordance with the invention, is accomplished through the use of a light source or sources which are visible from the outside of the housing of the storage system via indicator windows. Also, in apparatus in accordance with the invention, the character of the visual indication which will be observed through these windows is caused to vary in response to the removal and insertion of a recording medium into each holder of the system. The invention thus includes switch-over mechanisms for sensing the presence or absence of recording media and exercising control over the nature of the visual indication which is generated as a function of the sensed condition.

The method and apparatus of the present invention may, as will become obvious from the discussion below, be employed with all conventional recording media such as, by way of example, magnetic tape cassettes and optical storage discs, particularly the so-called "compact" discs which are utilized in the storage of audio and/or video data in digital form.

The manner of varying the visual indication provided by the present invention may generally be categorized as modulation. Such modulation may be accomplished by producing a change in the color of the light emitted from a viewing window, by switching the emitted light on and off or by combining these two general techniques. The light source or sources employed will be electrically energized and may comprise light emitting diodes or conventional incandescent lamps. The light sources, i.e , the light emitting diodes or lamps, may be associated with light guides including, but not limited to, fiber optics.

In one embodiment of the invention two electrically activated light sources of different color are provided for each recording media holder. One or both of these light sources may comprise light-emitting diodes. The manner in which the indication may be switched from one state to another may consist of electrically switching the power supply to the light sources. Alternatively, the switch-over may be accomplished by modulating the light produced by a single source by, for example, the selective interpositioning of a filter or filters between the light source and the viewing window. If such filtering is employed, it will typically be implemented by creating two light transmissive zones adjacent to one another on a common carrier. Such a carrier will be moveable in a direction transverse to the direction of travel of the light whereby the filters, i.e., the zones, may be brought alternately into the light path between the source and window. Obviously, it would also be possible to arrange the filters, and as used herein the term filter includes transparent and opaque zones, one behind the other in the light path. The modulation may thus comprise the selective interruption of the light path between a source and the indicator window. The recording media itself may function as the mechanism for interrupting the light path between the source and indicator window if this light path extends through the recording media receiving area of the holder.

The indicator or viewing windows for record media storage containers in accordance with the invention may be located in the front wall of the individual media holder or may be located in a front wall portion of the housing of the apparatus. Similarly, the means which senses the presence or absence of recording media in each holder may be mounted on the holder, and extend into the recording medium receiving region thereof, or may be mounted on the housing and project into the media receiving region of the holders. The mechanism associated with each holder which switches the indication from one state to another may be arranged on the holder. Thus, when the change of the display is accomplished through controlling the supply of current to a light source, an electrical switch may be carried by the holder for interrupting and/or establishing a circuit between a current source and a light source or sources. If the light sources are arranged on the holders, the current supply thereto may be interrupted when the holder is in the ejected position and the current path to the light sources may be reestablished upon reinsertion of the holders into the housing by the means of cooperating plug elements on the housing and holder or through the use of sliding contacts.

When the light which provides the holder status indication is transmitted from a light source to the indicator windows via light guides, such guides may be arranged entirely in the housing or they may be segmented and guided through the holders. In the latter case, a light guide coupling may be provided between the housing and the individual holders to relay the light, without significant loss, from the source to the light guide segments carried by the holders. The light guides may be covered except in the region of the indicator windows. The means for modulating the light may be located between securely arranged light guide sections. The switch-over mechanisms may comprise pivot levers which are spring biased into a first position. Such a pivot lever may have a tolerance-compensating bearing to insure proper positioning. This bearing may have open bearing shells. A lever stop for defining a second position of the lever, and thus a second modulation condition, may be provided and such stop will be reached after a partial pivotal movement of the lever thus insuring that contact between the stop and lever will be established.

In a storage systems according to the invention an operating button will be provided for each media holder and these operating buttons may be located adjacent to the indicator window for the holder. Light guides may extend, from a common light source, to the planes of the individual holders in the housing. The holders may be provided with hinged front flaps and, when the indicator windows are on the holders, the transmission paths for light to these windows are completed when the holder front flaps are pivoted upwardly and oriented generally in the plane of the front of the housing. The light source or sources may, in addition to being coupled to the indicator windows, also be employed for purposes of illuminating portions of the holder front flaps. Such illuminated portions may, for example, bear numbers. The present invention also encompasses the provision of means for illuminating a front of the housing of a recording media storage system. Thus, a light guide extending from a common light source, which is employed to provide illumination to the indicator windows, may be arranged to also provide illumination for the housing front. The light guides may be in the form optical fibers or optical fiber bundles. The indicating means, particularly the indicator windows, may be provided with means which enhance visibility during daylight operation such as, for example, filters which are reflective to light which impinges thereon from the exterior of the housing. The switch-over mechanisms may be provided with actuating means, positioned in that region of the holder which is inside the housing, which are operated by contact with the side of the recording media which faces the rear wall of the housing upon insertion of the recording media.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which:

FIG. 4 is a cross-sectional view taken along line IV—IV of FIG. 3;

FIG. 5 is a cross-sectional view taken along line V—V of FIG. 4;

FIG. 8 is a view similar to FIG. 4 but with the disc holder shown in the ejected position;

FIG. 9 is a view similar to FIG. 8 depicting the disc holder in the inserted position;

FIG. 10 is a cross-sectional view taken along line X—X of FIG. 8;

FIG. 11 is a partial view of apparatus in accordance with a second embodiment of the present invention, FIG. 11 being a view of this second embodiment taken in the direction of line IV—IV of FIG. 3;

FIG. 12 is a cross-sectional view of the FIG. 11 embodiment taken along line XII—XII of FIG. 11;

FIG. 13 is a perspective view, partly in section, of a detail of the embodiment of FIGS. 11 and 12;

FIGS. 15 and 16 are partial sectional views which depict a further embodiment of the present invention, the embodiment of FIGS. 15 and 16 being configured for the receipt and storage of magnetic tape cassettes.

DESCRIPTION OF THE DISCLOSED EMBODIMENTS

Figure 1:
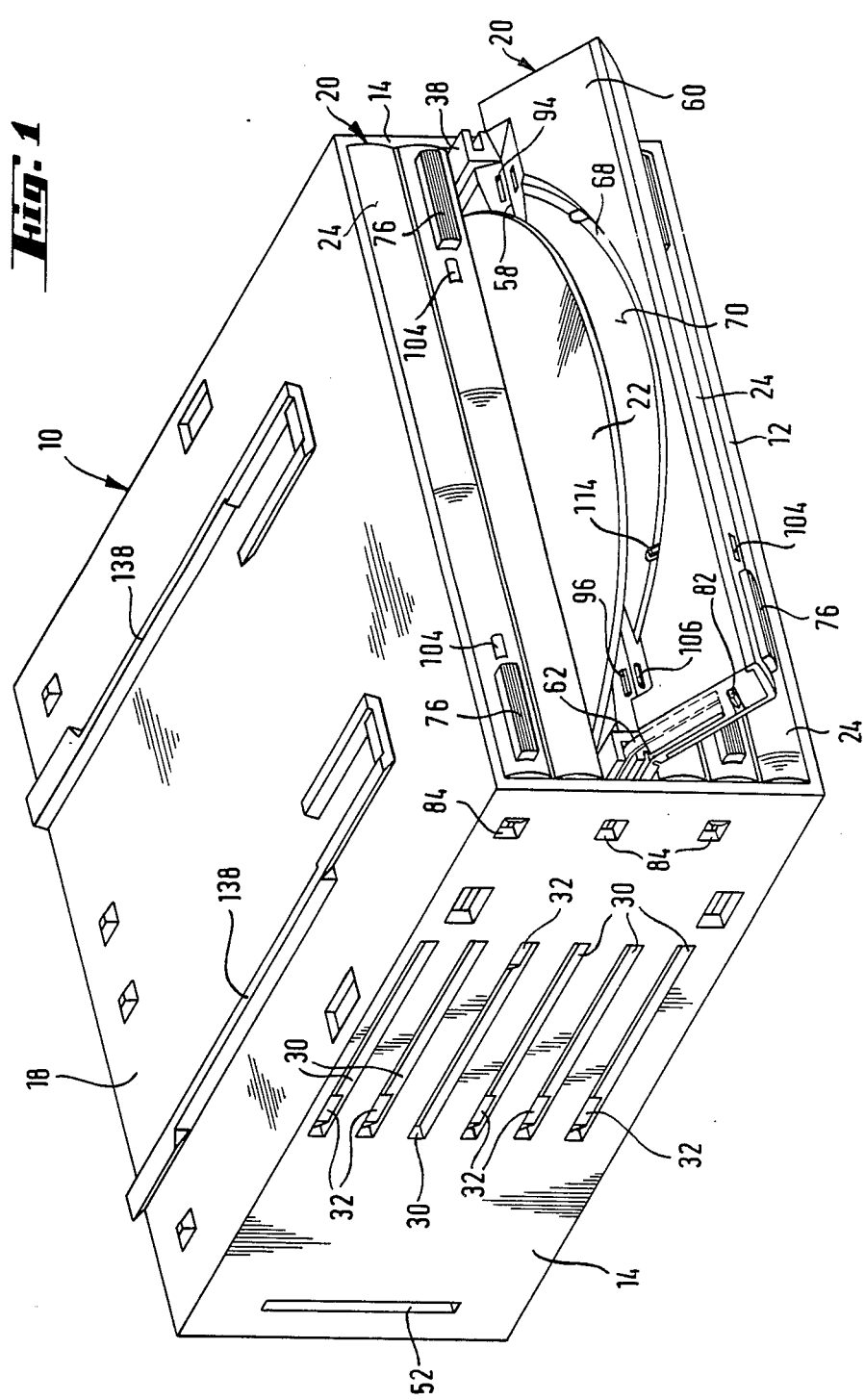
FIG. 1 is a perspective view of a storage system for disc-shaped recording media in accordance with the present invention.

With reference now to the drawing, particularly FIGS. 1 through 10, apparatus in accordance with the present invention will have a housing, indicated generally at 10, which is typically of parallelepipedal shape. The housing 10 is defined by a base 12, side walls 14, a rear wall 16, and a top wall 18. The housing 10 will be open at its front side. A plurality of recording media carrier holders 20 will be supported for reciprocal motion in housing 10. The holders 20 will each, when in the loaded condition, support a record media carrier. In the embodiment of FIGS. 1-10, the record media is disc-shaped and may, for example, be a so-called compact, i.e., optical data storage, disc. The holders 20 are each provided with a front wall 24. The front walls of all of the holders 20 accommodated in housing 10 cooperate, when the holders are in the inserted position, to define a plane which is recessed from the housing front side.

In order to provide access to stored record media, the holders 20 must be capable movement between an inserted position, where they are located substantially entirely within the housing, and an ejected position, where the holder extends partly from the front of the housing. In order to permit this reciprocal holder movement, guide ribs 226 are provided on the inside of the side walls 14 of housing 10. The holders are provided with complimentary lateral guide grooves 28 which engage the guide ribs 26. At the level of each holder 20, the housing side walls 14 are also provided with longitudinal slots 30 which extend in the direction of holder motion. Stop hooks 32 provided on the holders 20 are engaged in the slots 30 to limit holder motion in the ejection direction. The stop hooks 32 thus contact stop edges 34 of the slots 30 to define the the fully ejected position of the holders. The holder stop hooks 32 are each coupled, by way of resilient tongues 36 integrally formed therewith, to a receiving "platter" of the associated holder. Accordingly, upon assembly of the storage system, when each holder is first pushed into the housing, the stop hooks 32 will flex inwardly and then spring outwardly into the slots 30.

Each of the holders 20 has a rear edge 40 at the side of the holder located opposite to the front wall 24. Ejection springs 42 act on the holder rear edges 40 to bias the holders toward the ejected position. In the embodiment of FIGS. 1–10 these ejection springs are leaf-type and are provided with tongues 44 which contact the holder rear edges 40. As may be seen from FIG. 3, the ejector springs 42 may be in a form of pair of oppositely disposed comb-like members with plural tongues 44, the tongues extending inwardly from opposite sides of the housing and each spring acting upon alternately arranged individual holders. The ejector springs 42 may advantageously be introduced into the housing through openings 46 and each spring is then positioned between a rib or bar 48 and a stop 50. The ribs or bars 48 are integral with the side walls of the housing and extend parallel to the rear wall 16 thereof. The stops 50 are located adjacent to slots 52 provided in the housing side walls 14. The ejector springs 42 are further located and fixed by ribs 54 and 56, the latter ribs preventing the ejector springs from falling into the housing 10. The ribs 54 in part define the spring insertion openings 46 and the ribs 56 are angled behind the ribs 54. The slots 52 extend over less then the full height of the ejector springs 42 and thus the springs cannot be removed from the housing via the slots 52.

In the embodiment of FIGS. 1–10 the holders 20 are each provided, at the front of the recording media receiving portion 38 thereof, with a flap 60 that is joined to the "platter" 38 by means of a web-type hinge 58. The hinge 58 renders possible a relative pivotal movement of the flap 60 with respect to the "platter" 38. The degree of this pivotal movement may be limited by contact between the facing edges of the "platter" 38 and flap 60 at the opposite sides of the hinge. Each holder may also be provided with at least one leaf spring 62 which biases the flap 60 toward the hinged-down position. The springs 62 are received in slots 64, provided in both the "platter" 38 and its cooperating flap portion 60, and the angular movement of the flap 60 against the spring bias is limited by contact between the ends of the spring and the ends of the slots 64. In the non-hinged-down position, the flap 60 forms an extension of the receiving "platter" 38 and in this position the holder 20 may be fully inserted into the housing. As noted, in the ejected position of the holder the flap 60 is biased into the hinged-down position by the leaf spring 62 thereby facillitating the removal and insertion of a disc 22. In the ejected position of the holder 20, the receiving "platter" 38 will be pushed by the ejector spring 42 to its full forward position as defined by cooperation between the stop hooks 32 and stop edges 34 of slots 30, and in this position the portion of the "platter" 38 which projects beyond the front of the housing will form a guide face to aid the insertion of a disc 22.

The receiving "platter" portion 38 of each of the holders 20 may be provided with one or more integral hold-down members 66. These hold-down members 66, if included, will have inclined edges which face the open front of the housing 10 and will engage the upper side of the peripheral region of an inserted disc 22. As will be appreciated, the holders 20, with their hold-down members 66, may be molded parts. The holders 20 will, of course, extend the internal width of the housing 10 and will define a support face or rim 68 for the record media to be stored. This support face will preferably be recessed with respect to the upper face of the "platter" 38 and will contact only a peripheral region of an inserted disc 22. The support face 68 will continue onto the flap 60. In order to insure against damage to a stored record media, the annular support face 68 surrounds a basin-like recess 70. Thus, a disc 22 will be supported only in the region which does not contain recorded information. In the region of the support face 68, the receiving "platter" 38 may, if desired, be provided with resiliently displaceable tongue-like draw-in arms 72 integrally formed therewith. The arms 72, at the free end thereof, will each have a portion 74 that is angled upwardly and flanged on the inside. The draw-in arms 72 lie within the angled portions 74 laterally contacting a disc 22 when the disc has been fully inserted into the holder 20 or during the insertion thereof. When the holder is pushed out of the housing by the action of an ejector spring 42, the draw-in arms 72 retard motion of the disc when the ejection stroke of the holder is suddenly arrested by contact between a stop hook 32 and cooperating stop edge 34. Accordingly, the disc 22 will not be catapulted from the holder. The draw-in arms 72 also prevent or dampen vibration induced relative motion between the disc and holder which is particularly advantageous when the storage system is installed in a motor vehicle. When a disc 22 is inserted into a holder, the draw-in arms 72 insure that the disc 22 passes reliably into its end position so that it will not impede the rotation of flap 60 back up into the plane of the "platter" 38. It is particularly noteworthy that the draw-in arms 72 give tactile feedback to the user, i.e., the user will feel when the checking force of the draw-in arms 42 has been overcome and thus, without visual inspection, will be sure that disc 22 has been fully and safely stored. The ends of the portions 74 of the draw-in arms 72, which are bent down inwardly at right angles, extend over a stored disc 22 and insure that the draw-in arms 72 are not able to pass beneath a disc 22.

In order to retain the holders 20 in the inserted position in housing 10 and to selectively eject a holder, a locking arrangement is provided. In the embodiment of FIGS. 1–10 this locking arrangement includes an operating button 76 which is arranged in the front wall 24 of each holder. The operating buttons are mounted for reciprocal motion relative to the "platter" portions 38 of their associated holders. The operating buttons 76 act upon wedge-shaped projections 80 of locking slider members 78. As a result of cooperation between the buttons and wedge-shaped projections, locking projections 82 will be moved out of catches 84 in the housing sidewall 14 against the force of a return spring 86. The return springs 86 act on the free ends of the locking slider members 78. On reinsertion of a holder, its locking projection 82 automatically drops into a catch 84. In order to facilitate use of the storage system, in the disclosed embodiment the buttons 76 are arranged alternately on opposite sides of the housing.

A light source 88, in the form of an electrically energized lamp, is provided on the rear 16 of housing 10. As may be seen from FIG. 3, in the embodiment of FIGS. 1-10, the light source is centrally arranged and a plurality of light guides 90 extend outwardly from source 88. The light guides 90 are present in a number which corresponds to the number of holders 20 accommodated in the housing. The light guides 90 extend outwardly toward the side edges of the housing and through the housing rear wall at the level of each of the holders 20. Referring to FIG. 4, connectors 92, formed integrally with the housing rear wall 16, extend into the housing at the point where each light guides passes though the housing rear wall. The connectors 92 are complimentary in cross-sectional shape and size with the light guides 90, the light guides terminating within the connectors 92. The connectors 92 thus define, in the disclosed embodiment, rectangular sockets with the ends of the light guides 90 being at the base of these sockets. The connectors 92 are disposed adjacent to the free ends of the tongues 44 of the ejector springs 42. The holders 20 are each provided, on their undersides, with a channel 94 which extends to the holder front wall 24. The channels 94 receive light guide segments 96 of the same cross-section as the light guides 90. The channels 94 are closed by a cover strip 98 which, by way of example, is joined to the receiving "platter" portion 38 by means of snap-in type connections 100. Each holder 20, in the receiving "platter" portion 38 thereof, defines a recess 102 configured to receive a cooperating connector 92 on the housing. Thus, in the inserted position of a holder 20, a connector 92 will be located in a recess 102 and the end of a light guide 90 will be in adjacent facing relationship to an end of a light guide segment 96 as shownin FIG. 4. The cooperating connector 92 and the walls which define the recess 102 form a light trap which substantially prevents the the emergence of any stray light.

The channel 94 continues into the flap portion 60 of the holder and, in so doing, defines a discontinuity in the web-type hinge joint 58. The channel 94 terminates before the front wall 24 adjacent to an indicator window 104 which is arranged in the front wall. In the embodiment of FIGS. 1-10 the indicator windows are arranged adjacent to the operating buttons 76. A light guide segment 106, having the same cross section as the light guides 90, 96, is received in the portion of channel 94 which resides in the underside of the flap 60. A modulating member 108 is provided between the forwardly facing end of each of the light guide segments 106 and its associated indicator window 104. The modulating members may, for example, be in the form of a signal flag disposed at one end of a pivot lever 110. The pivot lever 110 is supported, in its central region, in an open socket type bearing 112 mounted in the flap 60. The modulating member 108 may, for example, have two transparent portions of different color or have transparent and non-transparent portions. Depending on whether the holder 20 is occupied by a disc 22, one of the two portions of each modulating member 108 will be in registration with an indicator window 104, i.e., will be disposed between the forwardly facing end of the light guide segment 106 and the indicator window 104. The free end 114 of the pivot lever 110, which acts as a button, projects into the supporting zone 68 for a disc 22 on the holder 20. Accordingly, when a disc is supported on a holder, the pivot lever 110 is pressed downwardly and the modulating member 108 is caused to pivot. Upon removal of a disc from the holder, the modulating member 108 will, under the action of a return spring, namely the return spring 86, return to its original position. The forgoing operation results from the fact that the second or free of the spring 86 engages the pivot lever 110 between the bearing 112 and free end 114, the central portion of the spring 86 being fixed in the flap 60.

Figure 6:
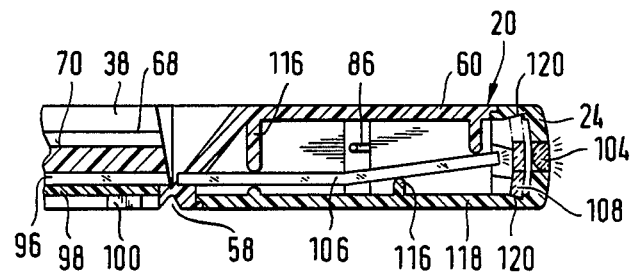
FIG. 6 is a cross-sectional view taken along line VI—VI of FIG. 4.
Figure 7:
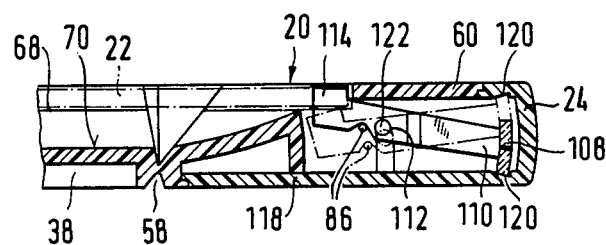
FIG. 7 is a cross-sectional view taken along line VII—VII of FIG. 4.

As can be seen from FIG. 6, the light guide 106 is positioned and supported in the flap portion 60 of the holder 20 by means of ribs 116. The ribs extend from both the top portion of the flap and the cover member 118. The flap 60 also defines, inside the cover 118, upper and lower stops 120 for the modulating member 108. The bearing 112, see FIG. 7, is designed such that after the button 114 has been moved over a distance which is approximately half its path length, the modulating member 108 will have already engaged a stop 120. Engagement of the modulating member with a stop results in the pin 122 of the pivot pin arm 110 being forced out of its bearing sockets. Accordingly, the second half of the path of motion of the button 114 is a tolerance zone. With the holder in the empty condition, the return spring 108 holds the pivot arm 110 in the bearing sockets.

The cover 118 extends from the top of the flap 60 to the bottom thereof and covers the locking and indicating means. The cover 118 is connected to the flap 60 by means of snap connectors 124 and is properly positioned and oriented by means of centering projections 126.

The holder 20 may be designed mirror-symmetrically with respect to a central plane in the direction of movement thereof and perpendicular to the plane of representation of FIG. 4. Accordingly, the operating button 76, locking slider member 78, receiving "platter" 38, flaps 60, window 104, light guides 96 and 106, return spring 86, and cover strip 98 can be used both on the right and left hand sides.

As may be seen from FIG. 10, the light guide segment 96 is positioned within the recess 102 provided therefor on the underside of the receiving "platter" 38 by means of a rib 128. That is, the rib 128 extends into the recess 102 so as to hold the light guide segment 96 in the position where it will, when the associated holder 20 is inserted into the housing, extend into the connector 92. As previously noted, the recess 102 is bounded by a cover strip 98 and the rib 128 extends from this cover strip.

Figure 2:
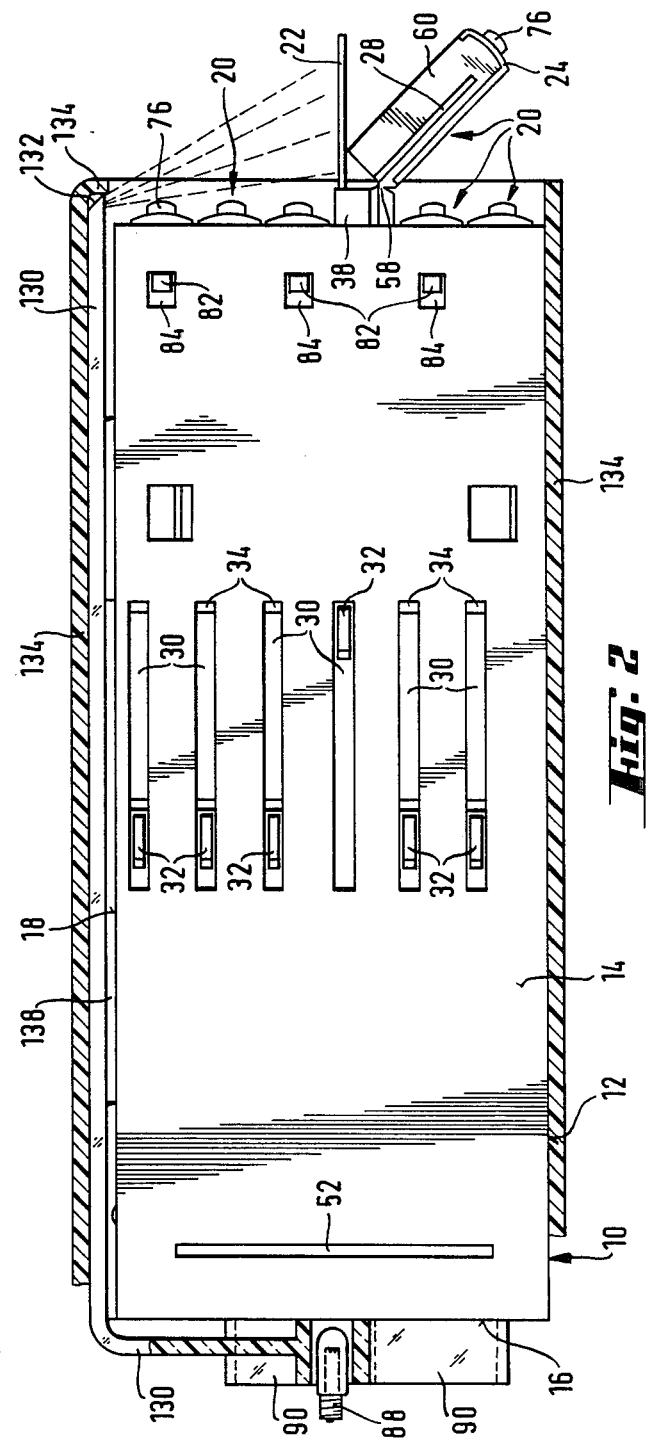
FIG. 2 is a schematic, cross-sectional, side elevation view of the apparatus of FIG. 1.
Figure 3:
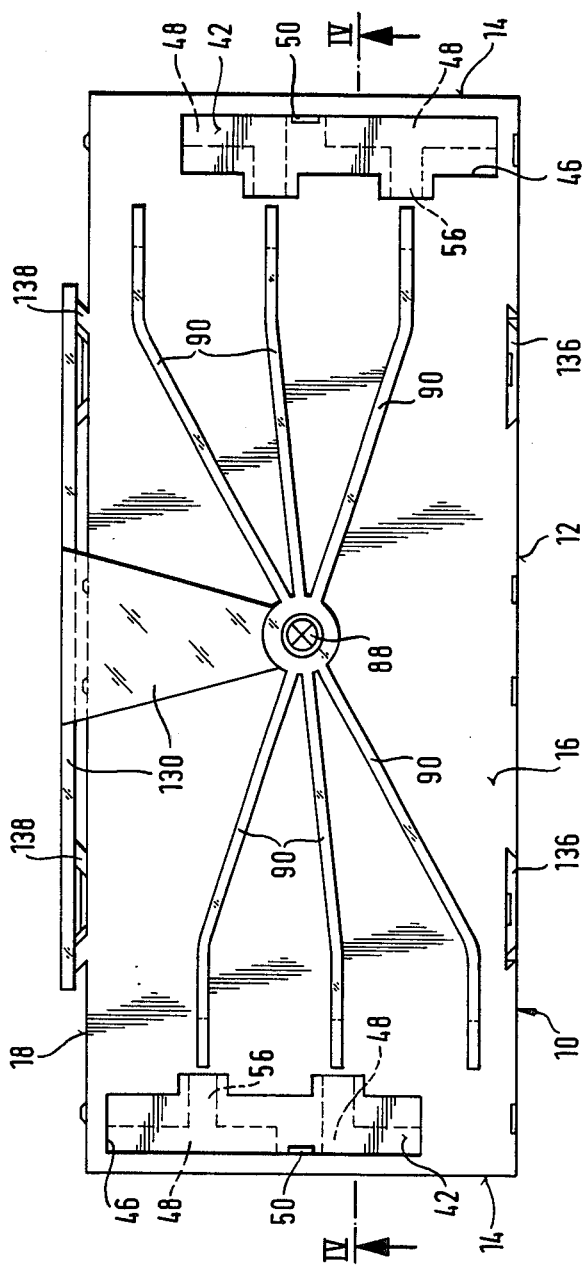
FIG. 3 is a rear view of the apparatus of FIGS. 1 and 2.

Referring again to FIGS. 1 and 3, a further light guide 130 may be extended onto the top wall 18 of housing 10 and extend forwardly to a position which is located slightly beyond the plane defined by the front walls 24 of the holders when fully inserted into the housing. The light guide 130 has, at its forwardly disposed end, a sloping portion 132. As a result of reflection from this sloping portion 132 of light guide 130, light transmitted via guide 130 will be directed onto the front region of the housing as represented in FIG. 2. A light stop, in the form of a downwardly turned edge 134, may be provided on the housing to cover the end of the light guide 130 to insure that the transmitted light is directed downwardly rather than outwardly along the axis of the light guide 130.

The housing 10 may be provided, respectively at its top and bottom, with grooves 136 and interlocking projections or springs 138. This enables the stacking of a plurality of the storage systems as represented in FIG. 1.

In the embodiment of FIGS. 11-13 the housing 10 is provided with lateral channels 140 associated with each of the holders 20. Light guides 90 extend from the light source 88 along these channels 140. In the region of the receiving "platter" 38 of each holder 20, inside the housing, a pivot lever 110 is mounted for rotational movement about the axis of a pin 122. The pivot levers 110 are biased in a first direction by means of springs 142 which act upon the pivot levers 110 adjacent the first ends 114 thereof. The first ends 114 of the pivot levers project into the disc support regions 68 of "platters" 38. The second ends of the pivot levers, which in the disclosed embodiment are approximately triangular in section, project through openings in the side wall 14 and into an associated channel 140. The second end of each of the pivot levers 110 engages a modulator, in the form of a signal flag 108, which is displaceably spring-biased toward the pivot lever 110 by means of a spring 144. The light guides 90 terminate adjacent to one side of the signal flags 108 and the light guide segments 106 extend from the other sides of the signal flag to the vicinity of the windows 104 at the front wall portion 24' of housing 10. The signal flags 108, in the embodiment of FIGS. 11-13, are provided with two transparent portions of different color arranged one above the other. If a disc is introduced to a holder 20, and the holder is pushed into the housing 10, the disc will press against the button 114 thus causing the pivot lever 110 to release the signal flag 108. Under these conditions, as a result of the biasing action of the spring 114, the signal flag 108 will be displaced thus resulting in the light being transmitted to window 104 being of a first color. When there is no disc stored on the holder, and thus the button 114 is not depressed, the second color light will be transmitted via the serially arranged light guides 90 and 106 to the window 104.

Figure 14:
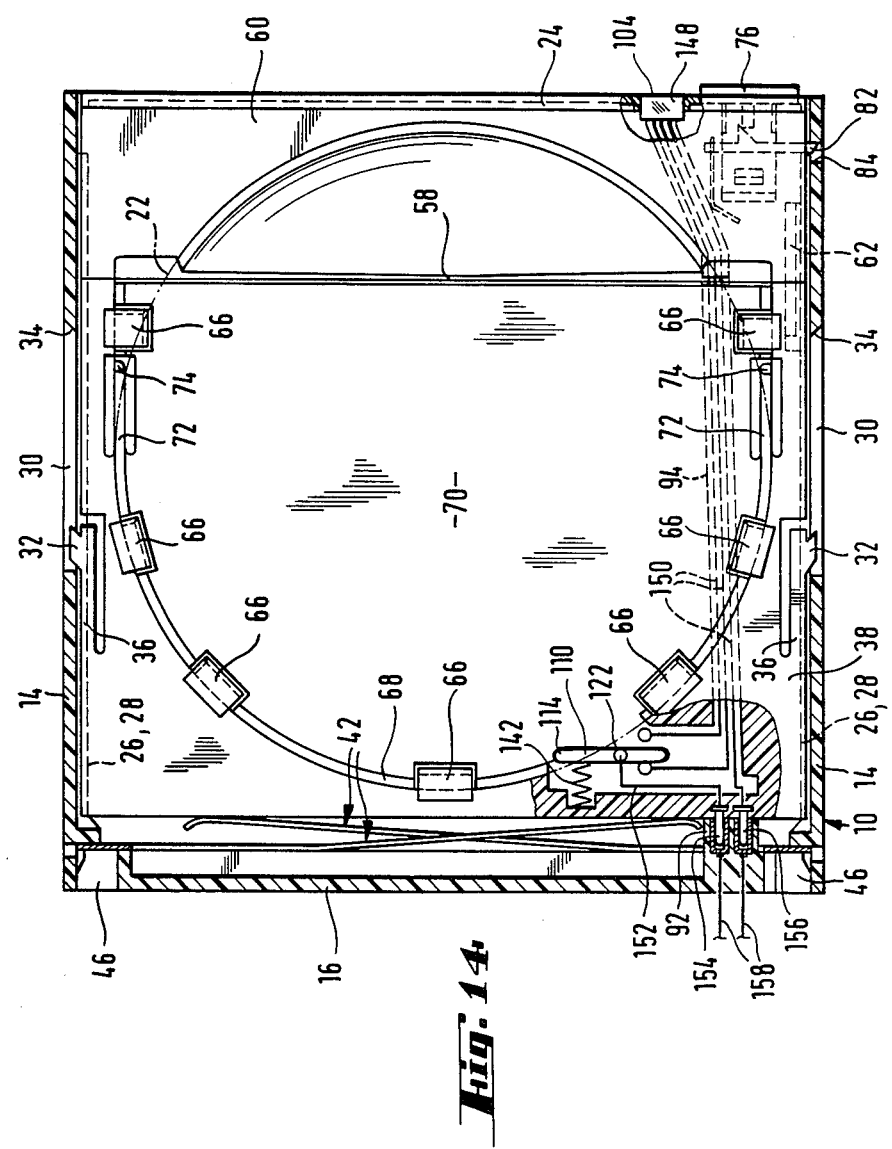
FIG. 14 is a cross-sectional view, similar to FIG. 11, depicting apparatus in accordance with a third embodiment of the present invention.

In the embodiment illustrated in FIG. 14, light emitting diodes 148 are provided in the indicator windows 104. By way of example, a pair of light emitting diodes, which will respectfully emit light of a different color, may be provided for each of the holders 20. Electrical current supply paths 150 will extend through the channels 94 from the diodes 148 to a switch. Thus, in the case of a pair of light-emitting diodes, two leads may extend to the spring biased pivot lever 110 which functions as a switching element, the lever 110 being arranged in relation to the receiving "platter" 38 in the manner shown in FIG. 11. A current supply conductor 152 extends from the pivot lever 110 to a plug contact 154 at the rear end of the holder 20. One of the conductors 150 extends to a further plug contact 156 which is positioned adjacent to contact 154 and, like contact 154, is carried by the holder 20. In the FIG. 14 embodiment the connector 92 is in the form of a socket which receives the contacts 154 and 156, the contacts of this socket being connected to the opposite polarity terminals of a current supply via conductors 158. Accordingly, the light emitting diodes 148 will be alternately energized depending upon the position of the pivot lever 110 and thus the color light emitted will indicate whether a disc is present on the "platter" 38.

In the embodiment of FIGS. 15 and 16, the housing 10 is configured to accommodate at least a first holder 20 for a magnetic tape cassette. The base 12 of the housing 10 is provided with guides slots 26 for the holder, the guide slots extending over a predetermined distance and thus defining the path of motion of the holder. The holder will, of course, be provided with the customary ejector spring and a locking arrangement will be provided to release the holder so that it can move to its forward limit position, as defined by the guides slots 26, under the influence of the ejection spring. The fully ejected position of the holder 20 will place a magnetic tape cassette disposed thereon in a position where it can be easily grasped and removed form the holder. The side wall 14 of the housing 10 has an inwardly directed rib 160 extending from the rear wall to the front edge of the housing. The rib 160 is provided with a bore which accommodates light guide 90. This light guide 90 may be illuminated at the rear of the housing by the light source 88. The light guide 90 terminates in a connector 92. The front wall 24 of the holder 20, at its inwardly facing side, defines a recess 102 which is complimentary in size and shape to the connector 92. A bore extends from the base of the recess 102 to the front face of the holder front wall 24. This bore receives a pair of light guide segments 96 and 106. The light guide segments 96 and 106 are spaced from one another so as to provide an area for operation of a modulator. In the embodiment of FIGS. 15 and 16 this modulator is in the form of a pivotally mounted signal flag 108. The bores in the rib 160 and in the front wall 24 of the holder 20 are aligned so that light will be transferred from the light source 98 to the indicator window 104 via the serially arranged light guide segments 90, 92, and 106. The signal flag 108 will typically have two transparent portions of different color and will be secured to a pivot lever 110 which is rotatable about pin 122. The end of the pivot lever 112 disposed oppositely with respect to the signal 108 carries a button 114. The pivot lever 110 is biased against a stop 120 by a spring 86 so that a portion of the signal flag 108 is positioned in the light path between the light guide segments 96 and 106 when there is no cassette stored on the holder 20. When a cassette is inserted in the holder, the button 114, which projects into the receiving space of the holder, will be pressed downwardly toward the base of the holder 20 by the cassette. Consequently, the lever 110 will be pivoted about its pivot axis, which is oriented parallel with respect to the axis of the serially arranged light guides, so that the signal flag 108 is pivoted to place its other color portion between the light guide segments 96 and 106. Accordingly, the color of the light which will be emitted from window 104 will indicate whether the holder 20 is occupied by a cassette when the holder is pushed into the housing 10 and the light source 88 is energized.

While preferred embodiments have been shown and described, various modifications and substitution may be made thereto without departing from the spirit and scope of the invention. Accordingly, it is to be understood that the present invention has been described by way of illustrations and not limitation.

What is claimed is:

1. A container for a plurality of recording media, comprising:
   a housing having an open front;
   a plurality of media carrier holders accommodated in said housing, said holders defining media carrier accommodation spaces, said holders being individually displaceable partly out of said housing into a position in which a recording media carrier may be inserted into and removed from said individual holder;
   means for covering said housing front;
   at least one light source;

light guiding means for guiding light provided by said at least one source to indicator windows in the front area of the container, each window beig allocated to one of said holders;

light modulation means for modulating light guided through said windows, said light modulation means being controlled independently for each window in response to presence and absence of a media carrier in the allocated holder, so as to indicate respectively presence and absence of media carriers in said holders when said open front is covered by said means for covering.

2. The container of claim 1 wherein said light modulation means include light color modulation means.

3. The container of claim 1 wherein said light modulation means includes shutter means.

4. The container of claim 1 wherein said at least one light source is an electrically energized light source.

5. The container of claim 4 including a first and a second light source, said light sources producing light of different color, one color being indicative of the absence of a media carrier and the other color being indicative of the presence of a media carrier.

6. The container of claim 42 wherein a single light source for said light guiding means.

7. The container of claim 6 wherein said light guiding means includes at least a first spider shaped light guide disposed between said single light source and light path planes extending in defined levels defined by said windows.

8. The container of claim 1 wherein said light modulating means include at least two light passage zones, at least one of said zones being colored, one of said zones serving as the indicator of the presence of a media carrier while another of said zones serves as the indicator of the absence thereof.

9. The container of claim 8 wherein said two zones are juxtaposed transverse to a light beam path established by said guiding means and are alternately displaceable into said path in response to presence and absence of a media carrier.

10. The container wherein said two zones are juxtaposed one behind the other in a light beam path established by said guiding means, at least one of said zones being displaceable out of said path in response to the absence of a media carrier.

11. The container of claim 1 wherein said modulation means each comprise light shutter means disposed in a light beam path to a said window established by said guiding means.

12. The container of claim 11 wherein said light path intersects a media carrier accommodation space, and wherein said shutter means includes an inserted media carrier.

13. The container of claim 1 wherein each of said holders has a front wall and wherein said means for covering said housing front includes said holder front walls, said window being provided in said front walls.

14. The container of claim 1 wherein said housing front covering means include a front wall portion having said windows.

15. The container of claim 1 wherein a sensor is provided for controlling said modulation means, said sensor being displaced in response to insertion of a media carrier in the holder carrier accommodation space.

16. The container of claim 15 wherein a sensor is provided for each media carrier accommodation space, said sensors being mounted on said housing.

17. The container of claim 15 wherein each of said holders is provided with at least one sensor.

18. The container of claim 1 wherein said modulation means are arranged in each holder.

19. The container of claim 18 wherein each holder has an allocated light source.

20. The container of claim 1 wherein said light guiding means comprises light transmission means mounted in said housing.

21. The container of claim 1 wherein at least a portion of said light guiding means is mounted in each holder.

22. The container of claim 21 wherein said guiding means includes a light guide coupling between light guiding means portions in said housing and in said holders.

23. The container of claim 21 wherein said light guiding means portions in said holders are masked.

24. The container of claim 1 wherein said light guiding means are sectioned and said modulation means are displaceable between light guiding means sections.

25. The container of claim 15 wherein a sensor is provided for each holder and each said sensor includes a lever pivotal between a first position in which it extends into a said media carrier accommodation space, and a second position into which it is deflected by a media carrier, and spring means for biasing said lever into said first position.

26. The container of claim 25 including a tolerance absorbing pivot bearing for said lever.

27. The container of claim 26 wherein said bearing includes open bearing shells and a stop for defining said second end position.

28. The container of claim 1 including a button adjacent each window for releasing outwards displacement of an allocated holder.

29. The container of claim 1 wherin each holder includes a pivotally displaceable front flap, and wherein said light guiding means includes sections extending through each said holder and its said front flap, said light guiding means sections for each holder being optically coupled upon said flap being pivoted into a position flush with said holder.

30. The container of claim 1 wherein means are provided for illuminating at least a first additional surface region of said container at the front of said housing with light provided by said at least one light source.

31. The container of claim 1 further including means for illuminating surface areas of said container at the front of said housing apart from said windows.

32. The container of claim 31 wherein said means for illuminating surface areas includes a light guide section extending from said light source to said housing front.

33. The container of claim 1 wherein said light guiding means include fiber-optic light guides.

34. The container of claim 1 wherein said windows have means for attenuating impinging light.

35. The container of claim 1 wherein said modulation means includes an actuator mounted in each holder, said actuators sensing presence and absence of an end edge of a media carrier and controlling the operation of said modulation means.

36. The container of claim 1 wherein said light guiding means include plastics molded members.

* * * * *

UNITED STATES PATENT AND TRADEMARK OFFICE
CERTIFICATE OF CORRECTION

PATENT NO. : 4,760,502

DATED : July 26, 1988

INVENTOR(S) : Peter Ackeret

It is certified that error appears in the above-identified patent and that said Letters Patent is hereby corrected as shown below:

```
Claim 1, line 15 (column 11, line 3) change "beig" to - being -
Claim 6, line 1 (column 11, line 24) change "42" to - 1 -
Claim 10, line 1 (column 11, line 43) after "container" insert
- of claim 8 -
Claim 29, line 1 (column 12, line 39) change "wherin" to - wherein -
Claim 35, line 3 (column 12, line 62) change "adge" to - edge -
```

Signed and Sealed this

Sixth Day of June, 1989

Attest:

DONALD J. QUIGG

Attesting Officer

Commissioner of Patents and Trademarks